United States Patent Office 3,503,069
Patented Mar. 24, 1970

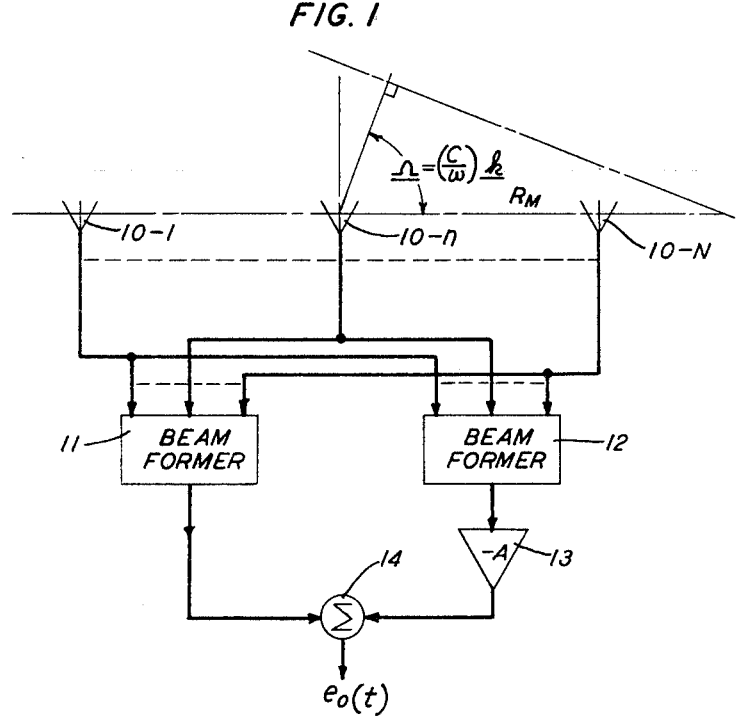
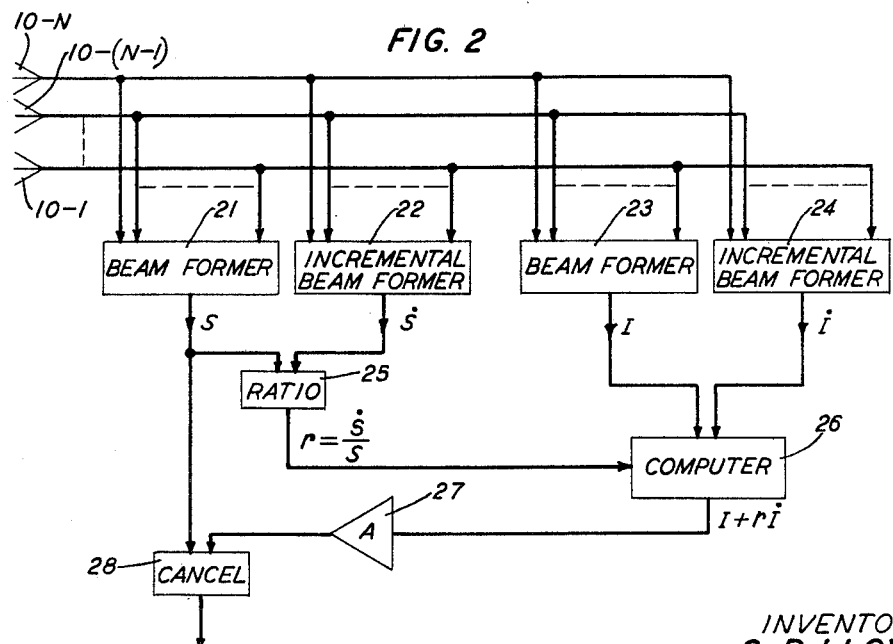

3,503,069
SYSTEM FOR NULLING ARRAY
SENSITIVITY PATTERNS
Stuart P. Lloyd, Summit, N.J., assignor to Bell Telephone Laboratories, Incorporated, Murray Hill and Berkeley Heights, N.J., a corporation of New York
Filed Feb. 27, 1968, Ser. No. 708,597
Int. Cl. H01q 3/26
U.S. Cl. 343—100     7 Claims

ABSTRACT OF THE DISCLOSURE

Both the sensitivity pattern of an array of signal receiving elements and a prescribed number of derivatives of this pattern are nulled in the same selected direction by appropriately processing the signals received by the elements in the array.

Government contract

The invention herein claimed was made in the course of, or under contract with the Department of the Navy.

Background of the invention

This invention relates to the reception of signals by arrays of receiving elements. In particular, this invention relates to the generation of stable nulls in the sensitivity pattern of an array of such elements.

Arrays of receiving elements are well known, particularly in the fields of radar and acoustics. Often it is necessary that an array of receiving elements be particularly sensitive to signals received from a selected direction, and particularly insensitive to signals received from other directions.

In particular, a signal coming from one direction is often masked by interference from another direction. To avoid difficulty in detecting the receipt of such a signal, arrays of receiving elements have been built with maximum sensitivity in the direction of the signal and zero sensitivity, a so-called "null," in the direction of the interference.

Unfortunately, although a null is theoretically placed in the sensitivity pattern of an antenna array, in practice, the null is often imperfect and interference energy is received from the direction of the null. This occurs for several reasons. First, properties of the transmission medium often fluctuate with time, changing the frequency of the received interference signal. Second, objects in the transmission medium often scatter and reflect the interference energy, producing small changes in the direction from which the interference arrives at the antenna array, again reducing the effectiveness of the null.

Summary of the invention

This invention partially overcomes the above problems by improving the stability of the nulls in array sensitivity patterns. This is achieved by nulling not only the sensitivity pattern of an array of receiving elements in selected directions, but also by nulling any prescribed number of derivatives of this sensitivity pattern in the same selected directions. The result is to provide a much improved rejection of unwanted signals without any appreciable decrease in array sensitivity to wanted signals. Indeed, when the background noises received at the receiving elements are equal and uncorrelated, this invention provides the highest signal-to-noise ratio possible while eliminating the unwanted signals.

According to this invention, the phases of the signals received by the elements of an array are adjusted to form a so-called "search beam," with maximum sensitivity in a direction from which a desired signal emanates. Interference emanating from another direction will also be detected by the search beam. Therefore, a second search beam is formed with maximum sensitivity in the direction of the interference. A null, in the direction of the interference, is provided by adjusting the amplitude of the signal detected by this second beam a selected amount, inverting this amplitude-adjusted signal in phase, and adding the inverted signal to the output signal produced by the first search beam. Cancellation of the interference results with only a slight attenuation of the desired signal.

Usually, however, the output signals produced by each search beam contain not only the undesired interference, but also so-called "skirts" resulting from signal reflections and motion of the transmission medium. The interference skirts on the search beam steered in the desired direction must be removed.

To do this, the signals produced by the elements in the array are processed not only by the usual search beams, but also by search beams whose characteristics represent the first through the $q^{th}$ derivatives, with respect to the relevant variables, of the array sensitivity pattern steered in the direction of the sought signal, where $q$ is a selected integer. The output signals from the array elements are also simultaneously processed by search beams whose characteristices represent the relevant first through $q^{th}$ derivatives of the sensitivity pattern steered in the direction of the interference. From these derivative processors are obtained output signals proportional to the first through $q^{th}$ order interference skirts on the array sensitivity patterns steered in the directions of both the sought and the interference signals.

Then, the signals proportional to the interference skirts on the sensitivity pattern steered in the direction of the interference are adjusted in amplitude by an amount proportional to the amplitude of the interference skirts on the sensitivity pattern of the search beam steered in the direction of the sought signal, and reversed in phase. Adding the amplitude-adjusted, phase-inverted, skirt patterns to the output signal formed by the search beam steered in the direction of the sought signal eliminates the interference skirts detected by this search beam.

This invention may be more fully understood in light of the following detailed description of the operation thereof taken together with the drawings.

Brief description of the drawings

FIG. 1 is a schematic block diagram of a system for nulling an array sensitivity pattern in a selected direction;

FIG. 2 is a schematic block diagram of a system for nulling both the sensitivity pattern and the first derivative of the array sensitivity pattern in a selected direction;

Theory

Figures 3, 4, 5:
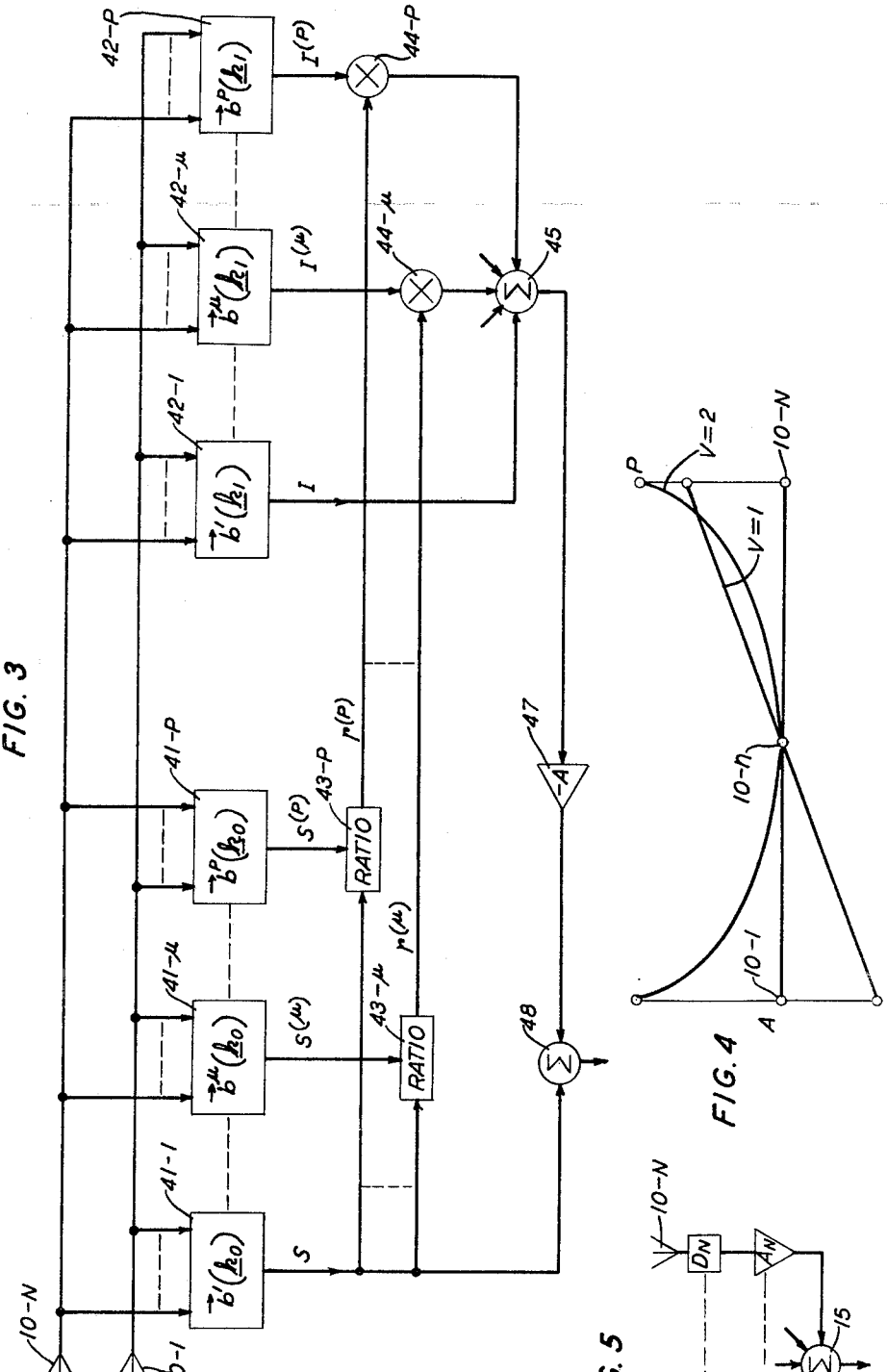
FIG. 3 is a schematic block diagram of a system for nulling the array sensitivity pattern and up to the $q^{th}$ derivative of this pattern in a selected direction.
FIG. 4 shows the signal weighting as a function of array element required to produce signals representing the first and second derivatives of the array sensitivity pattern.
FIG. 5 shows schematically the elements of the beam formers shown in FIGS. 1, 2 and 3.

In general when describing an array of receiving elements, such as the array of receiving elements 10–1 through 10–N shown in FIG. 1, one must distinguish between the individual signals produced by each element in the array prior to processing, and the signals derived from each element in the array after processing. Each element in an array of receiving elements produces an output signal whose phase, relative to the output signals produced by the adjacent receiving elements, is proportional to the angle made by the received signal's wavefront with the so-called "axis" of the array. When the array consists of receiving elements located on a straight line, the array is a so-called "linear array," and the axis of the array is this line. The output voltages of the elements in a linear array are in phase only when the signal wavefront arrives at the elements simultaneously, that is, from "broadside."

As is well known, it is possible to "steer" an array electronically to simulate the mechanical rotation of an array. This steering, called "beam forming," is accomplished by electronically phase shifting the output signals from the array elements in a prescribed manner. One forms a "search beam" for a given direction by bringing the signals produced by each element in the array in response to a unit amplitude plane signal from the given direction, to the same phase and then adding them. The sensitivity of the array so steered to signals from other directions is usually considerably below the sensitivity of the array to a signal from the given direction. The ratio of these sensitivities is a measure of the directional selectivity of the array. The array sensitivity as a function of direction forms what is called the array sensitivity pattern.

Now a plane wave $f(t,r)$ at angular frequency $\omega$ going in direction $\Omega$ has the value $$f(t,r) = Ae^{j\omega[t-(1/c)(r\cdot\Omega)]} \quad (1)$$

at vector point $r$ in space. In this equation, $t$ represents time; $A$ represents a complex amplitude; $\Omega$ represents the unit vector in the propagation direction; $c$ represents the wave velocity; and $j=\sqrt{-1}$. For convenience, it is customary to write Equation 1 as $$f(t,r) = Ae^{j[\omega t - r\cdot k]} \quad (1a)$$

where $k=(\omega/c)\Omega$ is the "wave vector." The direction of $k$ is the direction $\Omega$ of the plane wave, while the magnitude of $k$ is $\omega/c$, the "wave number." For notational convenience, the subscript, if any, on the direction vector $\Omega$, will be transferred to the wave vector $k$. Thus, for example, $k_0 = (\omega/c)\Omega_0$ and $k_1 = (\omega/c)\Omega_1$.

If $r_n$ is the position vector of the $n^{\text{th}}$ element, then the output voltage $e_n(t)$ of this element in response to the plane wave of Equation 1 is $$e_n(t) = Ahe^{j[\omega t - r_n\cdot k]}, n=1,\ldots N \quad (2)$$

Here $h$ is the transfer coefficient of the element with, for example, dimensions of volts per unit pressure when the array is composed of acoustic receiving elements.

The usual search beam in the direction of $k$ is formed by bringing the signals represented by Equation 2 to the same phase and then adding them. If such a beam is formed in the direction of $k_0$ and a plane wave, represented by Equation 1, is incident on the array with wave vector $k$, then the array output signal is $$\sum_{n=1}^{N} e^{j[r_n\cdot k_0 - \Phi]} e_n(t) = NAh e^{j[\omega t - \Phi]}\psi_{k_0}(k) \quad (3)$$

In Equation 3, $\Phi$ is a reference phase such that the delays $\Phi - r_n\cdot k_0$ are all positive, and the term $$\psi_{k_0}(k) = \frac{1}{N}\sum_{n=1}^{N} e^{-jr_n\cdot[k-k_0]} \quad (4)$$

is defined as the directivity factor for the search beam in the direction of $k_0$ in response to a signal with wave vector $k$.

Now the output voltages of the elements are $e_1(t)$, $\ldots e_N(t)$. We may regard these $N$ complex numbers as the components of an $N$-dimensional vector $$\vec{e}(t) = (e_1(t),\ldots e_N(t))$$

in vector space U. To form a beam linearly from the outputs of the elements in the array requires rescaling each $e_n(t)$ by a magnitude and phase and then adding them all; that is, we form $$\sum_{n=1}^{N} \overline{b}_n e_n(t)$$

for some complex numbers $b_1,\ldots,b_N$, where the symbol $(-)$ stands for the complex conjugate. This sum is just the so-called "inner product"

$$(\vec{e}(t),\vec{b})$$

in vector space U, with $$\vec{b} = (b_1,\ldots b_N)$$

For the purposes of this specification it is sufficient to define the inner or scalar product of the vectors $$\vec{u} = (u_1,\ldots u_N) \text{ and } \vec{v} = (v_1,\ldots v_N)$$

both in U, as $$(\vec{u},\vec{v}) = \sum_{n=1}^{N} u_n \overline{v}_n \quad (5)$$

Also, the length or "norm" of $\vec{n}_n$ is $$||\vec{u}||^2 = (\vec{u},\vec{u}) = \sum_{n=1}^{N} |u_n|^2 \quad (6)$$

A unit vector in U is any vector $$\vec{u} \text{ such that } ||\vec{u}|| = 1$$

if $u$ is a unit vector then so is $$e^{j\Phi}\vec{u} \text{ for any real phase } \Phi$$

The properties of $N$-dimensional unitary space, also known as Hilbert space, are defined in any standard textbook on the subject. See, for example, "Introduction to Hilbert Space" by Halmos, published in 1951 by Chelset Publishing Company, New York, N.Y.

Consider now the normalization. Suppose the array output is noise $$\vec{\nu}(t) = (\nu_1(t),\ldots \nu_N(t))$$

with $$<\nu_n(t)> = 0$$

$$<|\nu_n(t)|^2> = M$$

the constant noise power, $$<\nu_l(t)\overline{\nu_n(t)}> = 0$$

$l \neq n$, $l,n=1,\ldots N$, where the symbol $<\ >$ means expected value. If a beam with vector $\vec{b}$ in U is formed, then the noise power in the beam signal is $$<|(\vec{\nu}(t),\vec{b})|^2> = ||\vec{b}||^2 M$$

and for $b$ a unit vector this is the same as each individual element possessing noise power $M$. For signal-to-noise ratio comparison purposes, then, all beam forming vectors in U are normalized to unit vectors.

The output signals from each of the elements of the array before processing, produced by a signal with wave vector $k$, may be regarded as a vector $$\sqrt{N}Ahe^{j\omega t}\vec{b}(k) \text{ where } \vec{b}(k)$$

is the unit vector in vector space U with components $$\vec{b}(k) = \left(\frac{1}{\sqrt{N}}e^{-j[r_n\cdot k]}, n=1,\ldots N\right) \quad (7)$$

The directivity factor $\psi_{k_0}(k)$ given by Equation 4 is thus just the inner product $$(\vec{b}(k), \vec{b}(k_0))$$ of the unit vectors $\vec{b}(k), \vec{b}(k_0)$ in vector space U.

Now, suppose the vector of element output voltages in space U has the form $$\vec{e}(t) = \alpha \vec{b}(k_0) + \beta \vec{b}(k_1) \qquad (8)$$

where $$\vec{b}(k_0) \text{ and } \vec{b}(k_1)$$

are the unit vectors produced by elements 10–1 through 10–N of the array shown in FIG. 1, prior to the processing of the waves with wave vectors $k_0$ and $k_1$, respectively. The coefficient $\alpha$ represents the sought signal and $\beta$ represents the interference. If we form an array search beam with a vector $\vec{b}$ in space U, then the output of the beam forming box 11 (FIG. 1) will be $$(\vec{e}, \vec{b}) = \alpha(\vec{b}(k_0), \vec{b}) + \beta(\vec{b}(k_1), \vec{b}) \qquad (9)$$

We want to fashion the search beam $\vec{b}$ in such a manner as to make the inner product $$(\vec{b}(k_1), \vec{b}) = 0 \text{ and the inner product } |(\vec{b}(k_0), \vec{b})|$$

as large as possible. In addition we want $\vec{b}$ to remain at all times a unit vector in vector space U. The first condition requires the interference signal $$\beta(\vec{b}(k_1), \vec{b})$$

to vanish in the beam output. The second condition makes the sought signal $$\alpha(\vec{b}(k_0), \vec{b})$$

as large as possible in magnitude, given that the other conditions are satisfied. And the third condition normalizes the search beam to standard noise power.

In vector space U we have the following problem. We want a unit vector in U orthogonal to one given vector $$\vec{b}(k_1)$$

and with as large as possible a component along another given vector $$\vec{b}(k_0)$$

To find this vector we decompose U into two orthogonal subspaces: a one dimensional subspace $U_1$ consisting of all complex multiples of $$\vec{b}(k_1)$$

and the N–1 dimensional subspace $U_2$ of vectors orthogonal to $$\vec{b}(k_1)$$

The vector $$\vec{b}(k_0)$$

is decomposed into two vectors $$\vec{u}_1 + \vec{u}_2$$

relative to these subspaces. Explicitly, $$\vec{u}_1 = (\vec{b}(k_0), \vec{b}(k_1))\vec{b}(k_1) \qquad (10)$$

is the projection of the unit vector $$\vec{b}(k_0)$$

in the direction of the sought signal along the direction of the interference $$\vec{b}(k_1)$$

$u_2$ is the projection of $$\vec{b}(k_0)$$

on the subspace $U_2$ and is given by $$\vec{u}_2 = \vec{b}(k_0) - (\vec{b}(k_0), \vec{b}(k_1))\vec{b}(k_1) \qquad (11)$$

Since $$\vec{b}(k_0) = \vec{u}_1 + \vec{u}_2$$

and since the search beam vector $\vec{b}$ is required to lie in vector space $U_2$ by the first condition, we have $$(\vec{u}_1, \vec{b}) = 0$$

and $$(\vec{b}(k_0), \vec{b}) = (\vec{u}_2, \vec{b}) \qquad (12)$$

Now, both $$\vec{u}_2 \text{ and } \vec{b}$$

lie in the subspace $U_2$ and as the search beam vector $\vec{b}$ varies over all unit vectors in $U_2$, the inner product $$(\vec{u}_2, \vec{b})$$

is largest in magnitude when $$\vec{b} \text{ is in the direction of } \vec{u}_2$$

Thus, the vector $\vec{b}$ satisfying the above three conditions is unique. We denote it by $$\vec{b}^{\perp}(k_0)$$

and have $$\vec{b}^{\perp}(k_0) = \frac{\vec{b}(k_0) - (\vec{b}(k_0), \vec{b}(k_1))\vec{b}(k_1)}{[1 - |(\vec{b}(k_0), \vec{b}(k_1))|^2]^{1/2}} \qquad (13)$$

where the denominator is a scaling factor to make $$\vec{b}^{\perp}(k_0)$$

a unit vector.

The directivity factor for this optimal nulled beam is $$\Psi^{\perp}_{k_0}(k) = (\vec{b}(k), \vec{b}^{\perp}(k_0)) = \frac{\Psi_{k_0}(k) - \Psi_{k_0}(k_1)\Psi_{k_1}(k)}{[1 - |\Psi_{k_0}(k_1)|^2]^{1/2}} \qquad (14)$$

It should be noted that the search beam $$\vec{b}^{\perp}(k_0) \text{ makes the inner product } |(\vec{b}(k_0), \vec{b})|$$

as large as possible. Thus $$\vec{b}^{\perp}(k_0)$$

is the optimum search beam for eliminating the interference from direction $k_1$ and the signal-to-noise ratio of the output signal produced by search beam $$\vec{b}^{\perp}(k_0)$$

is the best possible signal-to-noise ratio, given uncorrelated noise at each receiving element in the array.

FIG. 1 shows the implementation of the search beam required by Equation 13. Beam former 11 phase shifts and sums the output signals from elements 10–1 through 10–N in such a manner as to produce a search beam in the direction of the sought signal $$\vec{b}(k_0)$$

Beam former 12 delays and sums the output signals from elements 10–1 through 10–N to produce a search beam with maximum sensitivity in the direction of the interference $$\vec{b}(k_1)$$

The output signal from beam former 12 is both amplified a selected amount $A = \psi_{k_0}(k_1)$ and inverted in phase in amplifier 13. Summing network 14 then combines the signal from amplifier 13 with the output signal from beam former 11 to produce an array output signal from which the interference has been removed.

In the case where the interference is the same frequency as the sought signal, the setting A of amplifier 13 is calculated by computer. When the interference differs in frequency from the sought signal, the setting A of amplifier 13 can also be determined empirically.

By removing the interference, the amplitude of the sought signal has been reduced by an amount at most equal to the square of the relative amplitude of the side lobes of the array search beam. Typically, the side lobes of the usual search beam are, at most, one-fifth the amplitude of the main beam. Now, from Equation 14, the amplitude of the search beam in the direction of the interference must be multiplide by a factor $\psi_{k_0}(k_1)$ equal to the side lobe amplitude in the direction of $k_1$ of a search beam steered in the direction of $k_0$. When the side lobe is, at most, one-fifth the amplitude of the main search beam, the upper bound on the attenuation of the sought beam, as a result of nulling the interference, is .2 db after normalization.

Derivative corrections

The interference may not be exactly a monochromatic plane wave; various random elements in the propagation medium can introduce "skirts" in both frequency and direction on the nonochromatic plane wave first approximation. Thus, the interference, rather than possessing a wave vector $k_1$, will appear to possess the wave vector $k_1 + \Delta k_0$. With $$\vec{b}(k) = \left(\frac{1}{\sqrt{N}} e^{-j r_n \cdot k}, \; n = 1, \ldots N\right) \quad (15)$$

again the unit vector of element outputs produced by a wave with wave vector $k$, we have $$\frac{\partial \vec{b}(k)}{\partial k_x} = \left(-\frac{j}{\sqrt{N}} x_n e^{-j r_n \cdot k}, \; n = 1, \ldots N\right) \quad (16)$$

where $k_x$ is one of the three coordinates of $k$. Similar expressions result for $k_y$ and $k_z$. Thus, we have to contend with three new vectors in subspace U. The phases $e^{-j r_n \cdot k}$ are the same as for the beam $$\vec{b}(k)$$

but the amplitudes are no longer constant with $n$ but vary the amplitudes are no longer constant with $n$ but vary linearly as $r_n$ for $n = 1, \ldots N$. We subtract out the component of each new vector along $$\vec{b}(k)$$

and normalize to unit vectors in U. The result is $$\vec{b}^x(k) = \left(\frac{x_n - \bar{x}}{\sqrt{N \mu_x}} e^{-j r_n \cdot k}, \; n = 1, \ldots N\right) \quad (17)$$

with $$\bar{x} = \frac{1}{N} \sum_{n=1}^{N} x_n \quad (18a)$$

$$\mu_x = \frac{1}{N} \sum_{n=1}^{N} (x_n - \bar{x})^2 \quad (18b)$$

and similar expression for $$\vec{b}^y(k), \vec{b}^z(k)$$

Here $x$, $y$ and $z$ are the Cartesian coordinates of the position vector $r_n$. We now rotate the three-dimensional coordinate axes in such a way as to make the vectors $$\vec{b}^x(k), \vec{b}^y(k), \vec{b}^z(k)$$

mutually orthogonal vectors in U. Thus, $$\frac{\partial \vec{b}(k)}{\partial k_x}, \frac{\partial \vec{b}(k)}{\partial k_y} \text{ and } \frac{\partial \vec{b}(k)}{\partial k_z}$$

lie in the subspace of U spanned by the orthogonal unit vectors $$\vec{b}(k), \vec{b}^x(k), \vec{b}^y(k), \text{ and } \vec{b}^z(k)$$

Suppose the vector in subspace U of eelment outputs has the form $$\vec{e} = \alpha \vec{b}(k_0) + \beta \vec{b}(k_1) + \sum_{\sigma=x,y,z} \gamma_\sigma \vec{b}^\sigma(k_1) \quad (19)$$

with $\alpha$ proportional to the sought signal with wave vector $k_0$, $\beta$ proportional to the interference signal with wave vector $k_1$ and $\lambda_x$, $\gamma_y$, $\gamma_z$ representing skirts of the interference signal.

Now the search beam $\vec{b}$ must be fashioned in such a manner as to make the inner products $$(\vec{b}(k_1), \vec{b}) \text{ and } (\vec{b}^\sigma(k_1), \vec{b})$$

all zero for $\sigma = x, y, z$. In addition $$|(\vec{b}(k_0), \vec{b})|$$

must be made as large as possible and $\vec{b}$ must remain at all times a unit vector in vector space U. The first two conditions imply that the directivity factor $$(\vec{b}(k), \vec{b})$$

and its first derivatives vanish for the wave vector $k = k_1$; that is, the directivity pattern is said to have a second order null in the interference direction $k_1$.

The unique beam forming vector $\vec{b}$ satisfying the above conditions is obtained as before. That is, we project $$\vec{b}(k_0)$$

the signal vector, on the subspace of U orthogonal to $$\vec{b}(k_1), \vec{b}^x(k_1), \vec{b}^y(k), \text{ and } \vec{b}^z(k_1)$$

and then normalize to a unit vector. The result is the doubly nulled beam forming vector $$\vec{b}^{\perp\perp}(k_0) =$$

$$\frac{\vec{b}(k_0) - (\vec{b}(k_0), \vec{b}(k_1))\vec{b}(k_1) - \sum_{\sigma=xyz}(\vec{b}(k_0), \vec{b}^\sigma(k_1))\vec{b}^\sigma(k_1)}{\left[1 - |(\vec{b}(k_0), \vec{b}(k_1))|^2 - \sum_{\sigma=xyz}|(\vec{b}(k_0), \vec{b}^\sigma(k_1))|^2\right]^{1/2}}$$

$$(20)$$

The directivity factor, or array sensitivity to a signal with wave vector $k$ when the array is steered in the direction of $k_0$, is $$\Psi_{k_0}^{\perp\perp}(k) =$$

$$\frac{\Psi_{k_0}(k) - \Psi_{k_0}(k_1)\Psi_{k_1}(k) - \sum_{\sigma=xyz}\Psi_{k_0}^\sigma(k_1)\Psi_{k_1}^\sigma(k)}{\left[1 - |\Psi_{k_0}(k_1)|^2 - \sum_{\sigma=xyz}|\Psi_{k_0}^\sigma(k_1)|^2\right]^{1/2}} \quad (21)$$

with the term $\psi_{k_0}(k)$ as given in Equation 4, and the term $\psi_{k_0}^\sigma(k)$ given by $$\Psi_{k_0}^x(k) = (\vec{b}(k), \vec{b}^x(k_0)) = (\vec{b}^x(k), \vec{b}(k_0))$$

$$= \frac{1}{N} \sum_{n=1}^{N} \frac{(x_n - \bar{x})}{\sqrt{\mu_x}} e^{-j r_n \cdot [k - k_0]} \quad (22)$$

and similarly for $\sigma=y,z$. $\bar{x}$ and $\mu_x$ are defined by Equations 18a and 18b. Equation 22 shows that the $n^{th}$ component of the derivative beam has an amplitude proportional to the location $\sigma_n$ of the $n^{th}$ array element producing that component.

The overall sensitivity pattern is seen to consist of three parts. The term $\psi_{k_0}(k)$ represents the sensitivity of the usual $k_0$ beam to a signal with wave vector $k$, $\psi_{k_1}(k)$ represents the sensitivity of a beam toward the interference to a signal with wave vector $k$, and $\psi_{k_1}{}^\sigma(k)$ for $\sigma=x,y,z$, represent the sensitivities of incremental beams in the interference direction to a signal with a wave vector $k$.

FIG. 2 shows an implementation of this doubly nulled search beam for the case of a single interference skirt. Beam-former 21 produces a search beam in the direction of the sought signal from signals produced by transducers 10–1 through 10–N, while beam-former 23 produces a search beam in the direction of the interference from these same transducer signals. Beam-former 22 produces a derivative or "incremental" search beam in the direction of the sought signal, while beam-former 24 produces a derivative search beam in the interference direction. The output signal from beam-former 22, for example, is directly proportional to the amplitude $\psi_{k_0}{}^\sigma(k_1)$ of the interference skirt detected by the search beam in the direction of $k_0$, the wave vector of the sought signal. Now Equation 21 can be rewritten as follows:

$$\Psi_{k_0}(k) = \frac{\Psi_{k_0}(k) - \Psi_{k_0}(k_1)\left[\Psi_{k_1}(k) + \sum_{\sigma=xyz}(\Psi_{k_0}{}^\sigma(k_1)/\Psi_{k_0}(k_1))\Psi_{k_1}{}^\sigma(k)\right]}{\left[1 - |\Psi_{k_0}(k_1)|^2 - \sum_{\sigma=xyz}|\Psi_{k_0}{}^\sigma(k_1)|^2\right]^{1/2}} \quad (23)$$

In accordance with Equation 23, the ratio $$r = \frac{\Psi_{k_0}{}^\sigma(k_1)}{\Psi_{k_0}(k_1)}$$

of the interference skirt to the total interference signal is formed in network 25. Then, in accordance with Equation 21 this ratio is used in computer 26 to weight the incremental beam from beam-former 24 prior to the combination of this weighted incremental beam with the output signal produced by beam-former 23. Amplifier 27 then weights the output signal $I+rI$ from computer 26 by the amount $A=\psi_{k_0}(k_1)$. Finally, network 28 subtracts the signal from amplifier 27 from the output signal from beam-former 21. The output signal from network 28 consists of the search beam in the direction of the sought signal, doubly nulled in the direction of the interference.

Interestingly, for equally spaced array elements, the fluctuations of $\psi_{k_0}(k_1)$ and $\psi_{k_0}{}^\sigma(k_1)$ on the side lobes are roughly like sin and cos, with the result that the amplitude of the normalized sought signal is still down only .2 db relative to the sought signal produced by an optimal unnulled beam. And again, depending on the relative frequencies of the sought signal and the interference, the gain $A$ of amplifier 27 can be either calculated by computer or set empirically.

Higher derivatives

An analysis similar to the analysis for the single nulled search beam and the doubly nulled search beam shows that there is an optimal search beam with any prescribed number of higher order partial derivatives nulled out in the interference direction. For convenience, the analysis will be carried out in terms of the previously defined three dimensional wave vector $k=(\omega/C)\Omega$ of a plane wave. What will be nulled out are the various partial derivatives of the directivity factor $\psi_{k_0}(k)$ steered in the direction of $k_0$, the wave vector of the sought signal, with respect to components of the wave vector $k$ of the interference.

When three variables are relevant (two spatial dimensions and frequency), the number of partial derivatives of order $\nu$ is $(\nu+1)(\nu+2)/2$. As we are going to null out all partial derivatives from order $\nu=0$ to order $\nu=q$, inclusive, then the total number of derivatives involved is $$P = \sum_{\nu=0}^{q} \frac{(\nu+1)(\nu+2)}{2} = \frac{(q+1)(q+2)(q+3)}{6} \quad (24)$$

Each derivative nulled uses one complex dimension in space U, there being N complex dimensions in all, as there are N receiving elements in the array.

The formulas for nulling all partial derivatives up to order $q$, inclusive, are obtained as follows: First, all partial derivatives of the unit vector $$\vec{b}(k)$$

are formed in space U. Each derivative will be a vector in space U having the form $$Q(x_n, y_n, z_n)e^{-j r_n \cdot k}, \quad n=1, \ldots \quad (25)$$

where $Q(x,y,z)$ is a multinominal in the components $x,y,z$, of position vector $r$. This yields P vectors in space U. Applying the Schmidt orthogonalization procedure to this set of P vectors produces P orthogonal unit vectors in space U. The Schmidt orthogonalization procedure is a well known and explicit step-by-step method for constructing orthogonal unit vectors spanning the same subspace in U as a given set of vectors. See the book by Hamburger and Grimshaw entitled "Linear Transformations in n-Dimensional Vector Space," pages 14 and 15, published in 1951 by the Cambridge University Press for an explicit description of this procedure. In carrying out the orthogonalization procedure, we take the lower order derivatives before the higher order derivatives.

The resulting set of P orthogonal unit vectors is denoted by $$\vec{b}^\mu(k)$$

where $\mu=1, \ldots P$. The indexing of these vectors is such that for each value of $\nu$ up to $q$, the subspace of U spanned by all derivatives from order 0 to order $\nu$, inclusive, is also spanned by the vectors $$\vec{b}^1(k), \vec{b}^2(k), \ldots \vec{b}^\rho(k)$$

where $\rho$ has the value $$\rho = \frac{(\nu+1)(\nu+2)(\nu+3)}{6}$$

Note that when derivative order $\nu$ equals $q$, the running index $\rho$ equals P. When this numbering is used, the vectors for lower order derivatives do not change if it is decided to increase the value of $q$.

Each vector $$\vec{b}^\mu(k)$$

will be of the form $$\{R(x_n, y_n, z_n)e^{-j r_n \cdot k}, \quad n=1 \ldots N\}$$

where $R(x,y,z)$, a multinomial in the components of $r$ (that is, $x,y,z$) has a degree equal to the order of the derivatives involved in its formation.

The theory for nulling out all derivatives of the directivity factor up to order $q$ in the interference direction is the same as for the cases $q=0$ and $q=1$ already described. That is, we project $$\vec{b}(k_0)$$

onto the subspace of U orthogonal to $b^\mu(k_1)$, $\mu=1, \ldots$ $P$, and normalize to a unit vector. The optimal $q$-null beam forming vector is $$\vec{b}^{(q)} = \frac{\vec{b}(k_0) - \sum_{\mu=1}^{P} (\vec{b}(k_0), \vec{b}^\mu(k_1)) \vec{b}^\mu(k_1)}{\left[1 - \sum_{\mu=1}^{P} |(\vec{b}(k_0), \vec{b}^\mu(k_1))|^2\right]^{1/2}} \quad (26)$$

and the resulting directivity factor is $$\Psi_{k_0}{}^{(q)}(k) = (\vec{b}(k), \vec{b}^{(q)}) = \frac{\Psi_{k_0}(k) - \sum_{\mu=1}^{P} \Psi_{k_0}{}^\mu(k_1)\Psi_{k_1}{}^\mu(k)}{\left[1 - \sum_{\mu=1}^{P} |\Psi_{k_0}{}^\mu(k_1)|^2\right]^{1/2}} \quad (27)$$

where $$\Psi_{k_0}{}^\mu(k) = (\vec{b}(k), \vec{b}^\mu(k_0))$$

denotes the directivity factor of the $\mu^{\text{th}}$ incremental beam formed for signals with wave vectors $k_0$. The signal-to-noise voltage ratio relative to the simple beam is down by $$\Psi_{k_0}{}^{(q)}(k_0) = \left[1 - \sum_{\mu=1}^{P} |\Psi_{k_0}{}^\mu(k_1)|^2\right]^{1/2} \quad (28)$$

FIG. 3 shows structure for nulling interference skirts representing up to the $q^{\text{th}}$ derivative of the sensitivity pattern of the search beam directed to the sought signal. The signals detected by the array of receiving elements 10–1 through 10–N are sent simultaneously to beam forming boxes 41–1 through 41–P, and 42–1 through 42–P. Beam forming box 41–1 produces a standard search beam $$\vec{b}^1(k_0)$$

in the direction of the wave vector $k_0$ of the sought signal. The output signal from box 41–1 is a composite of the sought signal and the interference. Box 41–$\mu$ produces the search beam $$\vec{b}^\mu(k_0)$$

which detects the $(\mu-1)^{\text{th}}$ interference skirt on the search beam $$\vec{b}^1(k_0)$$

produced by beam forming box 41–1. Box 41–P produces an incremental search beam $$\vec{b}^P(k_0)$$

in the direction of $k_0$. The output signal from box 41–P is proportional to the $(P-1)^{\text{th}}$ interference skirt on the search beam produced by box 41–1.

Beam forming box 42–1 produces a search beam $$\vec{b}^1(k_1)$$

in the direction of the interference wave vector $k_1$. The output signal from box 42–1 is also a composite of the sought signal and the interference. Incremental beam forming box 42–$\mu$ produces an output signal proportional to the $(\mu-1)^{\text{th}}$ interference skirt on the search beam produced by box 42–1. Incremental beam forming box 42–P produces an output signal proportional to the $(P-1)^{\text{th}}$ interference skirt on the output signal produced by box 42–1.

The output signals from each of the beam forming boxes 41–1 through 41–P and 42–1 through 42–P must be combined in such a way as to insure that the final output signal represents only the sought signal. The interference, together with the interference skirts caused by the first through the $q^{\text{th}}$ derivatives of the sensitivity pattern, must be removed from the output signal produced by beam former 41–1. Now Equation 27 can be rewritten as follows:

$$\Psi_{k_0}{}^q(k) =$$

$$\frac{\Psi_{k_0}(k) - \Psi_{k_1}{}^1(k^1)\left[\Psi_{k_1}{}^1(k) + \sum_{\mu=2}^{P}(\Psi_{k_0}{}^\mu(k_1/\Psi_{k_0}{}^1(k_1))\Psi_{k_1}{}^\mu(k)\right]}{\left[1 - \sum_{\mu=1}^{P} |\Psi_{k_0}{}^\mu(k_1)|^2\right]^{1/2}}$$

(29)

As required by Equation 29, the ratios $S^{(2)}/S$ through $S^{(P)}S$ are formed in networks 43–2 (not shown), through 43–P. These ratio signals $r^{(2)}, \ldots r^{(P)}$ are then used in networks 44–2 (not shown) through 44–P to adjust the amplitudes of the incremental signals from beam forming boxes 42–2 (not shown) through 42–P by the amounts $r^{(2)}$ through $r^{(P)}$, respectively.

The output signal from network 44–$\mu$ is combined in network 45 with the output signals from the other networks 44 and with the output signal from beam former 42–1. The resulting polynomial signal $$I + r^{(2)}I^{(2)} + \ldots + r^{(P)}I^{(P)}$$

is amplified by the amount $A = \psi^1{}_{k_0}(k_1)$ and inverted in phase in amplifier 47, and then is added to the output signal from beam former 41–1 in network 48. From network 48 is obtained the sought signal with the interference, and the interference skirts resulting from the first through the $q^{\text{th}}$ derivatives of the sensitivity pattern produced by the beam former 41–1, removed.

FIG. 4 shows the amplitude weighting required in incremental beam formers 41–2 through 41–P and 42–2 through 42–P to produce the signals representing the various interference skirts. Equations 16 and 25 each show that signals proportional to the first derivations of a beam forming pattern are produced by first phase shifting the output signals produced by the elements of a linear array as through forming a search beam in the desired direction, and then linearly weighting these output signals according to the position of each element in the array relative to the center point or origin of the array. The required linear weighting is shown in FIG. 4 by the curve labeled $\nu=1$. Likewise, Equation 24 shows that signals proportional to the interference skirts produced by the second derivatives of a search beam sensitivity pattern are obtained by phase shifting the output signals produced by the elements of a linear array as though forming a search beam in the selected direction and then weighting these output signals by a quadratic function of array element position relative to the array origin. This weighting is shown by the curve labeled $\nu=2$ in FIG. 4. In general, the interference skirts caused by the $\nu^{\text{th}}$ derivatives of the interference signal are produced by first phase shifting the output signals from the elements in the array as though forming a search beam in a selected direction, and then weighting these output signals by a $\nu^{\text{th}}$ order polynominal function. For a linear, symmetric array this function is odd when $\nu$ is odd, and even when $\nu$ is even. For clarity, such higher order functions are not shown in FIG. 4.

FIG. 5 shows schematically a typical beam former used in the embodiments of FIGS. 1, 2 and 3. Networks $D_1$ through $D_N$ delay the signals from trandsucers 10–1 through 10–N by the amounts required to form a search beam in a selected direction. Amplifiers $A_1$ through $A_N$, connected on a one-to-one basis to networks $D_1$ through $D_N$, adjust the amplitudes of the output signals from these delays by the amounts necessary to produce the required signal, whether it be a sought signal, an interference signal, or an interference skirt. Adding network 15 combines the signals from amplifiers $A_1$ through $A_N$ to produce the desired signal.

While this invention has been described in terms of nulling a single interference signal, it will be obvious that the principles of this invention can be extended to produce $q^{th}$ order nulls in the direction of several interfering signals simultaneuosly. Furthermore, while this invention has been described in terms of eliminating interference in the reception of a desired signal, it should be understood that in certain situations, obvious to those skilled in signal transmission, the principles of this invention can be used to prevent the transmission of signal energy and energy skirts in desired directions.

What is claimed is:

1. In an array of receiving elements,
means for nulling the sensitivity pattern of said array in any selected direction, and means for nulling prescribed derivatives of said sensitivity pattern in the same direction.

2. Apparatus which comprises
an array of signal receiving elements,
first processing means connected to said elements for nulling the sensitivity pattern of said array in a selected direction, and
second processing means connected to said elements for nulling prescribed derivatives of said sensitivity pattern in the same selected direction.

3. Apparatus as in claim 2 in which said second processing means comprise
means for nulling the first through $q^{th}$ derivatives with respect to selected variables of said sensitivity pattern in said selected direction.

4. Apparatus as in claim 2 in which said first and said second processing means comprise
first beam-forming means for combining the output signals from said elements so as to produce a search beam of maximum strength in the direction of a sought signal, said first beam-forming means producing a first processed signal composed of said sought signal, interference, and an interference skirt,
second beam-forming means for combining the output signals from said elements so as to produce a search beam of maximum strength in the direction of interference, said second beam-forming means producing a second processed signal composed of interference, an interference skirt, and said sought signal,
third beam-forming means for weighting and combining the output signals from said elements so as to produce an incremental search beam steered in the direction of said sought signal, said third beam-forming means producing a third processed signal with an amplitude proportional to the interference skirt on said beam of maximum strength in the direction of said sought signal,
fourth beam-forming means for weighting and combining the output signals from said elements so as to produce an incremental search beam steered in the direction of said interference, said fourth beam-forming means producing a fourth processed signal with an amplitude proportional to the interference skirt on said search beam of maximum strength in the direction of interference, and
means for generating from said first, second, third and fourth processed signals an output signal with a stable second order null in the direction of the interference.

5. Apparatus as in claim 4 in which said means for generating comprises
means for calculating the ratio of said third processed signal to said first processed signal,
means for producing an intermediate signal representing the sum of said second processed signal plus said fourth processed signal multiplied by said ratio,
means for weighting said intermediate signal a selected amount, and
means for combinnig said weighted intermediate signal with said first processed signal to produce an array output signal in which both said interference and said interference skirt have been eliminated.

6. Apparatus as in claim 2 in which said first and second processing means comprise
first beam-forming means for combining the output signals from said elements so as to produce a search beam of maximum strength in the direction of a sought signal, said first beam-forming means producing a first processed signal composed of said sought signal, interference, and interference skirts,
second beam-forming means for combining the output signals from said elements so as to produce a search beam of maximum strength in the direction of interference, said second beam-forming means producing a second processed signal composed of interference, interference skirts, and said sought signal,
a first set of P-1 beam-forming means for weighting and combining the output signals from said elements so as to produce P-1 incremental search beams steered in the direction of said sought signal, where P is a selected integer, said P-1 beam-forming means producing a first set of P-1 processed signals with amplitudes proportional to the first P-1 interference skirts on said beam of maximum strength in the direction of said sought signal,
a second set of P-1 beam-forming means for weighting and combining the output signals from said elements so as to produce P-1 incremental search beams steered in the direction of said interference, said second set of P-1 beam-forming means producing a second set of P-1 processed signals with amplitudes proportional to the first P-1 interference skirts on said beam of maximum strength in the direction of said interference, and
means for generating from said first processed signal, said second processed signal, said first set of P-1 processed signals, and said second set of P-1 processed signals, an output signal wit ha stable $q^{th}$ order null in the direction of the interference, where $q$ is an integer denoting the highest order derivative contributing to the P-1 interference skirts.

7. Apparatus as in claim 6 in which said menas for generating comprises
means for calculating the ratios of said first set of P-1 processed signals to said first processed signal thereby to produce a set of P-1 ratio siganls,
means for producing an intermediate signal representing the sum of said second processed signal and each of said second set of P-1 processed signals multiplied by a corresponding ratio signal from said set of P-1 ratio signals,
means for weighting said intermediate signal a selected amount, and
means for combining said weighted intermediate signal with said first processed signal to produce an array output signal in which both said interference and said interference skirts have been eliminated.

References Cited

UNITED STATES PATENTS

| 3,167,761 | 1/1965 | Parquier | 343—100 |
| 3,177,489 | 4/1965 | Saltzberg | 343—100 |
| 3,290,684 | 12/1966 | Renn et al. | 343—100 |
| 3,325,816 | 6/1967 | Dutton | 343—100 |
| 3,369,235 | 2/1968 | Odams et al. | 343—100 |

RODNEY D. BENNETT, Primary Examiner

H. C. WAMSLEY, Assistant Examiner

U.S. Cl. X.R.

343—854; 325—371